C. C. SPREEN

Dec. 10, 1929. MECHANICAL REFRIGERATION Re. 17,518

Original Filed July 27, 1926

Charles C. Spreen
Inventor
by Smith and Freeman
Attorneys

Reissued Dec. 10, 1929 Re. 17,518

UNITED STATES PATENT OFFICE

CHARLES C. SPREEN, OF DETROIT, MICHIGAN, ASSIGNOR TO KELVINATOR CORPORATION, OF DETROIT, MICHIGAN, A CORPORATION OF MICHIGAN

MECHANICAL REFRIGERATION

Original No. 1,711,252, dated April 30, 1929, Serial No. 125,186, filed July 27, 1926. Application for reissue filed June 12, 1929. Serial No. 370,389.

My invention relates to mechanical refrigeration, and particularly to sectional expansion units for mechanical refrigerating apparatus of the compressor-condenser-flooded-expander type and the particular object of my invention is to provide new and improved sectional expansion units particularly applicable to this use. In the drawings accompanying this specification and forming a part of this application I have shown, for purposes of illustration, one form which my invention may assume. In these drawings:

Figure 2 is a section on the line 2—2 of Figure 1, while

Figure 1:
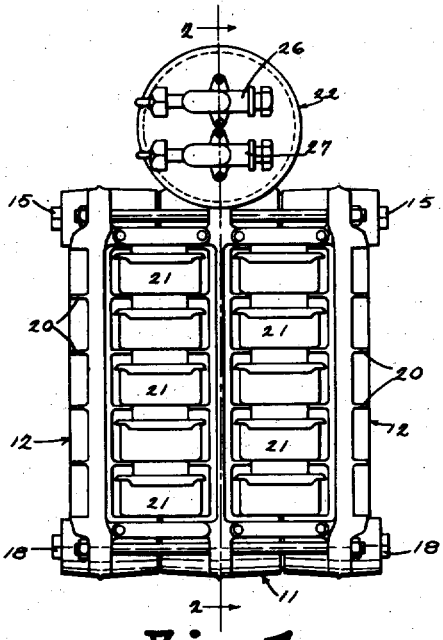
Figure 1 is a side elevation of this illustrative form of my invention.
Figure 2:
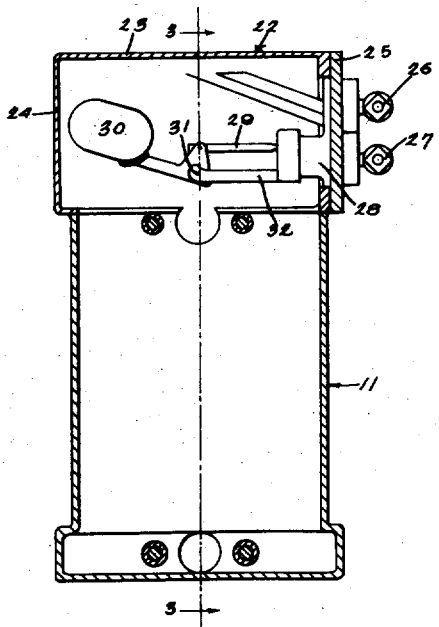
Figure 3:
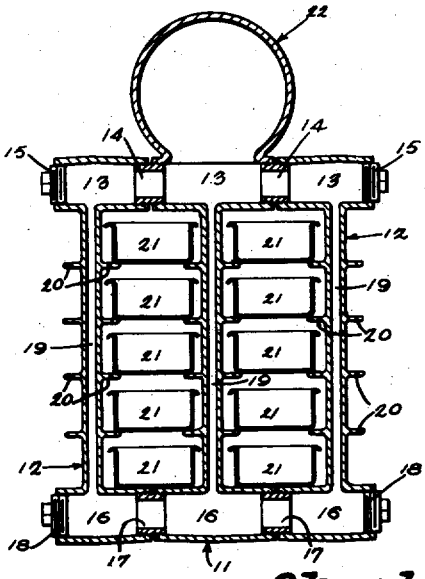
Figure 3 is a section on the line 3—3 of Figure 2.

The embodiment of my invention herein shown and described comprises an intermediate section 11 flanked by two end sections 12, and each of these sections comprises an upper connecting portion 13 arranged to receive at either end either a nipple 14 connecting that upper connecting portion 13 with the upper connecting portion 13 of an adjacent section, or a plug 15 closing that end of that upper connecting portion 13, a lower connecting portion 16 arranged to receive at either end either a nipple 17 connecting that lower connecting portion 16 with the lower connecting portion 16 of an adjacent section, or a plug 18 closing that end of that lower connecting portion 16, and a central heat transferring portion 19 extending beween and in communication with the upper and lower connecting portions 13 and 16 of that section and provided on either face with a plurality of fins 20 serving to increase the transfer of heat into or from the heat transferring portion 19 and, in cooperation with the fins 20 of an adjacent section, to provide suitable supports for receptacle 21 for the formation of artificial ice.

Integral with the upper connecting portion 13 of the intermediate section 11, and in communication therewith, is a chamber 22 arranged to receive control valve means for regulating the flow of liquid refrigerant into the expansion unit, this chamber 22 comprising a horizontal cylindrical body 23 integral with the upper connecting portion 13 of the intermediate section 11, closed at one end by an integral end wall 24, and closed at the other end by an end plate 25 secured in position in any suitable manner, supporting on its exterior the outlet shut-off valve 26 and the inlet shut-off valve 27, and supporting on its interior a block 28 containing an inlet duct (not shown) communicating with the inlet valve 27 and arranged to be closed by means of a valve 29 operated by a float 30 pivoted at 31 to a strut 32 extending outwardly from the block 28.

From the above description it will be apparent to those skilled in the art that I have provided a new and improved sectional expansion unit particularly adapted for use with refrigerating apparatus of the compressor-condenser-flooded-expander type. At the same time, it will also be obvious to those skilled in the art that the particular embodiment of my invention herein shown and described may be variously changed and modified without departing from the spirit of my invention or sacrificing the advantages thereof, and it will accordingly be understood that the disclosure herein is illustrative only and that my invention is not limited thereto.

I claim:

1. In a mechanical refrigerating apparatus of the compressor-condenser-flooded-expander type, an expansion unit comprising a plurality of sections connected with their interiors in operative communication, a chamber for the reception of control valve means integral with one of said sections with its interior in operative communication with the interior of said section, and control valve means operatively positioned within said chamber.

2. In a mechanical refrigerating apparatus of the compressor-condenser-flooded-expander type, an expansion unit comprising a pair of end refrigerating sections and an intermediate section all connected with their interiors in operative communication, a chamber for the reception of control valve means above and integral with said intermediate section with its interior in operative communication with the interior of said intermediate section, and control valve means operatively positioned within said chamber.

3. In a mechanical refrigerating apparatus of the compressor-condenser-flooded-expander type, a sectional expansion unit comprising a section arranged to be connected with its interior in operative communication with the interiors of other sections and comprising a chamber for the reception of control valve means integral with said section with its interior in operative communication with the interior of said section.

4. In a mechanical refrigerating apparatus of the compressor-condenser-flooded-expander type, a sectional expansion unit comprising a section arranged to be connected with its interior in operative communication with the interiors of other sections and comprising a chamber for the reception of control valve means above and integral with said section with its interior in operative communication with the interior of said section.

5. A refrigerating unit comprising hollow spaced apart side sections for containing the refrigerating fluid, a tubular spacer interposed between said sections at the bottom and communicating with the interior thereof, a float valve chamber, a tubular boss depending therefrom corresponding in width to said spacer and interposed between said sections at the top and communicating with the interior thereof and with said chamber, a float and float-operated valve within said chamber for controlling the admission of the refrigerating fluid.

6. A refrigerating unit comprising hollow spaced apart side sections for containing the refrigerating fluid having corresponding tubular bosses at the top and bottom of the adjacent sides projecting in line each with the other and communicating with the interior of the respective sections, a float valve chamber, a tubular boss depending therefrom of lesser width than said chamber and interposed between and in communication with the upper aligned side bosses, a tubular spacer similar in width to the valve chamber boss interposed between and in communication with the interior of the lower aligned side bosses, and a float and float-operated valve within said valve chamber for controlling the admission of the refrigerating fluid.

In testimony whereof I hereunto affix my signature.

CHARLES C. SPREEN.